(12) United States Patent
Marcin, Jr.

(10) Patent No.: US 7,144,220 B2
(45) Date of Patent: Dec. 5, 2006

(54) INVESTMENT CASTING

(75) Inventor: John J. Marcin, Jr., Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 138 days.

(21) Appl. No.: 10/903,294

(22) Filed: Jul. 30, 2004

(65) Prior Publication Data

US 2006/0021730 A1 Feb. 2, 2006

(51) Int. Cl.
*F01D 5/18* (2006.01)
*F01D 5/14* (2006.01)

(52) U.S. Cl. ............... 416/97 A; 416/231 R; 29/889.7; 415/173.1; 164/122.1

(58) Field of Classification Search ........... 416/97 A, 416/223 A, 231 R, 224; 164/361, 369; 29/889.7, 29/889.72, 889.721
See application file for complete search history.

(56) References Cited

U.S. PATENT DOCUMENTS

| | | | |
|---|---|---|---|
| 3,114,961 A * | 12/1963 | Chambers et al. | 416/231 R |
| 3,778,188 A | 12/1973 | Aspinwall | |
| 3,825,364 A * | 7/1974 | Halila et al. | 415/173.4 |
| 3,957,104 A * | 5/1976 | Terpay | 416/96 A |
| 4,148,350 A * | 4/1979 | Rossmann | 164/369 |
| 4,422,229 A | 12/1983 | Sadler et al. | |
| 4,697,632 A | 10/1987 | Lirones | |
| 4,789,140 A | 12/1988 | Lirones | |
| 6,224,329 B1 | 5/2001 | North | |
| 6,393,331 B1 | 5/2002 | Chetta et al. | |
| 6,412,541 B1 | 7/2002 | Roesler et al. | |
| 6,435,824 B1 | 8/2002 | Schell et al. | |
| 6,544,003 B1 | 4/2003 | Grylls et al. | |
| 6,637,500 B1 | 10/2003 | Shah et al. | |
| 6,648,596 B1 | 11/2003 | Grylls et al. | |
| 6,668,906 B1 | 12/2003 | Burd | |
| 6,742,698 B1 | 6/2004 | Shah et al. | |
| 2003/0085324 A1 * | 5/2003 | Battisti | 244/204 |

OTHER PUBLICATIONS

ERG Materials and Aerospace Corporation, DUOCEL Ceramic Foam, Oakland, California.
ERG Materials and Aerospace Corporation, Reticulated Vitreous Carbon, Oakland, California.
ERG Materials and Aerospace Corporation, DUOCEL Aluminum Foam, Oakland, California.
European Search Report for EP Patent Application No. 05254747.8.

* cited by examiner

*Primary Examiner*—Richard A. Edgar
(74) *Attorney, Agent, or Firm*—Bachman & LaPointe, P.C.

(57) ABSTRACT

An article may be manufactured by providing a reticulate core element in a mold shell having a shape at least partially corresponding to a shape of the article. The molten metallic material is introduced to the shell so as to at least partially infiltrate into the reticulate core element. The molten metallic material is permitted to solidify. The shell and the reticulate core element are destructively removed. The removal leaves the article with one or more gas-permeable porous regions.

25 Claims, 7 Drawing Sheets

INVESTMENT CASTING

BACKGROUND OF THE INVENTION

The invention relates to investment casting. More particularly, the invention relates to investment casting of cooled parts.

Investment casting is a commonly used technique for forming metallic components having complex geometries, especially hollow components, and is used in the fabrication of superalloy gas turbine engine components.

Gas turbine engines are widely used in aircraft propulsion, electric power generation, ship propulsion, and pumps. In gas turbine engine applications, efficiency is a prime objective. Improved gas turbine engine efficiency can be obtained by operating at higher temperatures, however current operating temperatures in the turbine section exceed the melting points of the superalloy materials used in turbine components. Consequently, it is a general practice to provide air cooling. Cooling is typically provided by flowing relatively cool air from the compressor section of the engine through passages in the turbine components to be cooled. Such cooling comes with an associated cost in engine efficiency. Consequently, there is a strong desire to provide enhanced specific cooling, maximizing the amount of cooling benefit obtained from a given amount of cooling air. This may be obtained by the use of fine, precisely located, cooling passageway sections.

A well developed field exists regarding the investment casting of internally-cooled turbine engine parts such as blades/vanes, seals/shrouds, and combustor components. In an exemplary process, a mold is prepared having one or more mold cavities, each having a shape generally corresponding to the part to be cast. An exemplary process for preparing the mold involves the use of one or more wax patterns of the part. The patterns are formed by molding wax over ceramic cores generally corresponding to positives of the cooling passages within the parts. In a shelling process, a ceramic shell is formed around one or more such patterns in well known fashion. The wax may be removed such as by melting in an autoclave. The shell may be fired to harden the shell. This leaves a mold comprising the shell having one or more part-defining compartments which, in turn, contain the ceramic core(s) defining the cooling passages. Molten alloy may then be introduced to the mold to cast the part(s). Upon cooling and solidifying of the alloy, the shell and core may be thermally, mechanically, and/or chemically removed from the molded part(s). The part(s) can then be machined, treated, and/or coated in one or more stages.

The ceramic cores themselves may be formed by molding a mixture of ceramic powder and binder material by injecting the mixture into hardened metal dies. After removal from the dies, the green cores are thermally post-processed to remove the binder and fired to sinter the ceramic powder together. The trend toward finer cooling features has taxed core manufacturing techniques. The fine features may be difficult to manufacture and/or, once manufactured, may prove fragile. Commonly-assigned co-pending U.S. Pat. No. 6,637,500 of Shah et al. discloses exemplary use of a ceramic and refractory metal core combination. Other configurations are possible. Generally, the ceramic core(s) provide the large internal features such as trunk passageways while the refractory metal core(s) provide finer features such as outlet passageways.

U.S. Pat. No. 4,789,140 discloses ceramic foam filtering material compatible with the casting of superalloys. U.S. Pat. No. 4,697,632 discloses use of such material in forming a core having a smooth exterior face. U.S. Pat. No. 6,648,596 discloses an airfoil having a tip region including a ceramic foam.

U.S. Pat. No. 6,544,003 discloses a turbine engine blisk having airfoils made at least in part of an open-cell solid ceramic foam.

SUMMARY OF THE INVENTION

One aspect of the invention involves the method for manufacturing an article. A reticulate core element is provided in a mold shell having a shape at least partially corresponding to a shape of the article. A molten metallic material is introduced to the shell so as to at least partially infiltrate into the reticulate core element. The molten metallic material is permitted to solidify. The shell and the reticulate core element are destructively removed. The removal of the reticulate core element leaves the article with one or more gas-permeable porous regions.

In various implementations, the porous regions may be chemically expanded. The solidified metallic material may be integrated with a metallic substrate. The method may be used to make a turbine engine blade outer air seal wherein the solidified material forms an exterior surface portion of the seal. The method may be used to make a turbine engine airfoil element wherein the solidified material forms an exterior surface portion of the airfoil or of an element platform. The reticulate core element may be formed by one or more of: coating reticulate organic material with a slurry (e.g., ceramic or metallic) and then firing; coating a reticulate organic material with a metallic layer; and coating a reticulate metallic material with a slurry and then destructively removing the reticulate metallic material. The reticulate core element may have a first region of essentially a first characteristic pore size (alternatively another porosity characteristic such as a volume fraction of porosity) and a second region of essentially a second characteristic pore size (or other porosity characteristic) smaller than the first characteristic pore size. The reticulate core element may be integrated with a non-reticulate core element. The non-reticulate core element may form one or more feed passageways. The porous regions may be outlet passageways in communication with the one or more feed passageways. The method may be used to manufacture a gas turbine engine component.

Another aspect of the invention involves a sacrificial investment casting core comprising a reticulate first portion and a non-reticulate second portion.

In various implementations, the second portion may be shaped for forming one or more feed passageways in a turbine airfoil element. The first portion may be shaped for at least partially forming one or more outlet passageways from the one or more feed passageways. The first portion may protrude from the second portion. The first portion may be secured to the second portion via a ceramic layer. The first portion may be secured to the second portion via a mechanical back-locking of the first portion relative to the second portion. The first portion may be secured to the second portion via one or more pins having portions received in recesses in each of the first and second portions. The first portion may be held spaced-apart from the second portion with a gap therebetween.

Such a core may be manufactured by a method including at least one of: securing the second portion to the first portion via a ceramic adhesive; welding the second portion to the first portion; joining the first and second portions via one or more pins received in associated recesses in the first and second portions; and/or other suitable methods.

Another aspect of the invention involves an article of manufacture having a cast metallic substrate with a cooling passageway system within the substrate. The cooling passageway system includes one or more feed passageways for receiving cooling gas. The cooling passageway system includes one or more outlet passageways for discharging the cooling gas from the one or more feed passageways and having a reticulate passageway portion.

In various implementations, the substrate may form a major, by weight, portion of the article. The metal of the substrate may be a single continuous piece of an alloy. The metal of the substrate may be an iron-, nickel-, or cobalt-based superalloy. The article may be a turbine element having an airfoil extending between inboard and outboard ends and having pressure and suction side surfaces. The reticulate portion may be located within a sidewall of the airfoil. The reticulate portion may form a trailing edge outlet of the airfoil. The reticulate portion may be located within a platform of the turbine element. There may be multiple such reticulate portions in multiple such locations.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figures 1, 2, 3:
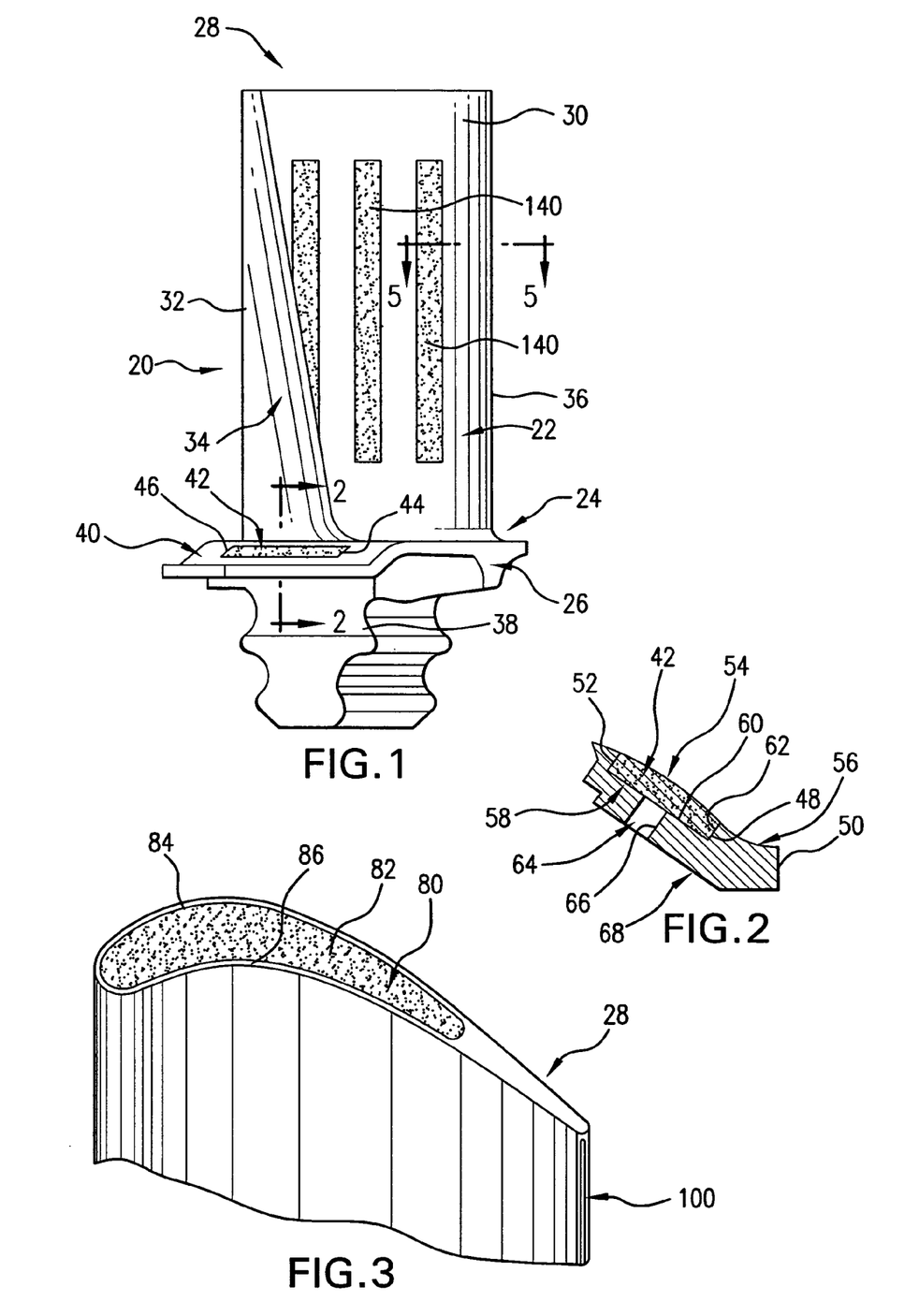
FIG. 1 is a view of a gas turbine engine blade according to principles of the invention.
FIG. 2 is a sectional view of a platform of the blade taken along line 2—2.
FIG. 3 is a view of a tip region of the blade of FIG. 1.

FIG. 1 shows a gas turbine engine blade 20 (e.g., from a turbine section of the engine). The blade may comprise a unitarily-formed metallic casting, optionally coated for thermal and/or chemical protection. The general configuration of the exemplary blade 20 is considered merely illustrative. The blade includes an airfoil 22 extending from a root 24 at a platform 26 to a tip 28. The airfoil has pressure and suction side surfaces 30 and 32 extending between leading and trailing edges 34 and 36. A disk attachment portion (e.g., a so-called fir tree blade attachment root) 38 depends from the underside of the platform 26 (e.g., depending/inboard/underside indicating a direction generally toward rather than away from the engine centerline). As thus described, the blade may be of a variety of known or yet-developed general configurations.

The exemplary blade 20, however, may include one or more of several improvements for encouraging heat transfer and/or controlling weight. FIG. 1 shows a leading portion 40 of the platform 26 including an enhanced heat transfer region 42. In the exemplary embodiment, the enhanced heat transfer region 42 is circumferentially elongate, extending between first and second ends 44 and 46 proximate first and second circumferential sides of the platform 26, and between a leading side 48 (FIG. 2) near a leading end 50 of the platform and a trailing side 52 near the airfoil. In the enhanced heat transfer region 42, the metal of the casting is reticulated, providing the region with degrees of porosity and permeability. The region 42 has an outboard boundary 54 generally continuous with an adjacent outboard surface 56 of the platform 26. The region 42 has an inboard boundary 58 within the platform 26.

In the exemplary embodiment, although unitarily formed with a remainder of the casting, the region 42 appears as if captured within a compartment of non-reticulated metal having a base 60 and a lateral perimeter 62. In alternative implementations, the reticulated metal may be separately formed (e.g., by infiltrating a reticulate preform of final or near final shape and then removing the preform or by cutting/machining from an undifferentiated metallic foam block or other piece). It may then be integrated with the unreticulated metal (e.g., a casting) such as by welding or diffusion bonding. In the exemplary embodiment, this virtual compartment is not a blind compartment and thus the region 42 is not blindly within the unreticulated metal. A passageway 64 having a perimeter surface 66 extends from the region 42 to the inboard surface or underside 68 of the platform 26. The passageway 64 allows gas communication from the underside 68 through the passageway 64 and through the region 42 to exit the boundary 54. Depending on pressure gradient, communication may be in a reverse direction. With communicating gas consisting essentially of cooling air, the high specific surface area of the region 42 enhances heat transfer to cool the platform. In some alternative embodiments, the region 42 may extend fully between inboard and outboard platform surfaces 68 and 56. In other alternative embodiments, the region 42 may be blind (e.g., lacking communication with a passageway). With such a blind situation, there may still be a moderate degree of enhanced heat transfer between the region 42 and gas flowing over the surface 56 and boundary 54.

As is described in further detail below, the region 42 may be formed by the use of a reticulated casting core element (e.g., a ceramic foam such as alumina, silica, zirconia, and/or zircon). With such an element incorporated into a shelled investment casting pattern (which may also include one or more substantially non-reticulated ceramic or other cores), upon ultimate casting, the metal infiltrating the reticulated ceramic core will have an essentially inverse reticulation. After solidification of the metal, the ceramic may be chemically removed, leaving the region 42 with porosity and permeability. The porosity and permeability may further be enhanced by subsequent chemical etching of the as-cast metal of the region 42.

Exemplary reticulated foam for such casting cores resembles an interconnected three dimensional web interspersed with interconnected cellular voids (or pores in the foam). When the metal is cast into the foam, the metal takes the form of the voids. When the foam is removed, the pores in the metal have the elongate interconnected web structure of the foam. Exemplary foam has a pore size from fifty pores per inch (ppi) up to five ppi. A narrower exemplary range is from 30 ppi to 10 ppi. With many reticulated foams, the thickness of the foam material between pores increases or decreases with pore size. Thus a foam material with a smaller pore size (e.g., 50 ppm) will tend to cast a metal part with finer passageways, greater specific surface area (and thus heat transfer), and greater resistance to flow than material with a larger pore size. The pore/passageway size of the cast metal may be characterized in several ways. One parameter involves taking a section through the casting and measuring the linear dimensions of the pores along the section. Due to the elongate nature of the pores, one may look to minimum transverse dimensions as characteristic of dimensions perpendicular to the length of the passageway. In an exemplary inspection of a casting made from 30 ppi foam, transverse dimensions were in the vicinity of (300–1100) micrometer, averaging close to (550) micrometer. With 20 ppi foam, they were (350–1300) micrometer, avenging close to (760) micrometer. With 10 ppi foam, they were (800–1700) micrometer, averaging close to (1000) micrometer.

Another parameter, however, is the volume fraction of porosity. For this parameter, the properties of the cast part will vary inversely with those of the foam core. Thus, to achieve a cast part volume fraction of porosity of 10%, the foam core would have a volume fraction of porosity of essentially 90%. Exemplary as-cast volume fractions of porosity are 10–50%, more narrowly 15–30%.

FIG. 3 shows a further enhancement in the form of a reticulated region 80 within a portion of the airfoil adjacent the tip 28. The region 80 has an outboard boundary 82 and a perimeter 84 circumscribed by a wall region 86 of unreticulated material. The region 80 has an inboard boundary 88 (FIG. 4) adjacent internal feed passageways 90 within the blade. In operation, cooling air from the passageways 90 enters the inboard/interior boundary 88, passing through the region 80 and exiting the outboard/exterior boundary 82. The exemplary inboard boundary 88 may also be continuous with outboard ends of walls 92 separating the passageways 90.

Figure 4:
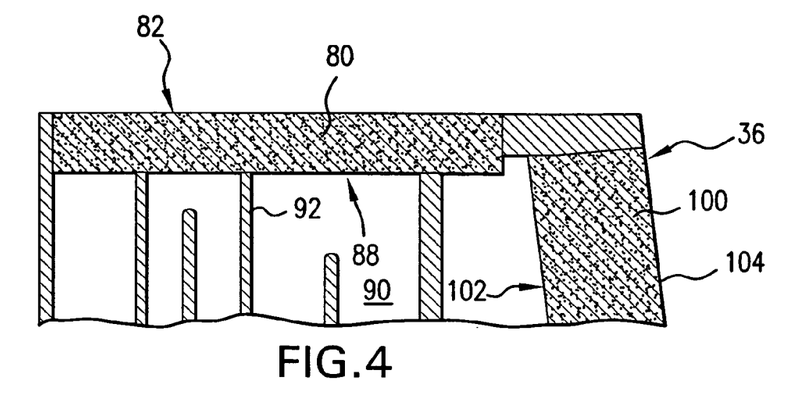
FIG. 4 is a mean sectional view of the tip region of FIG. 3.
Figure 5:
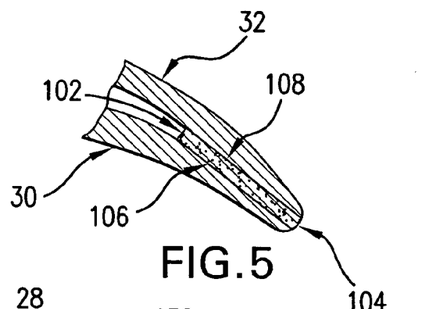
FIG. 5 is a streamwise sectional view of a trailing edge portion of an airfoil of the blade of FIG. 1.

FIG. 4 shows a further enhancement in the form of a reticulated region 100 defining an outlet slot from a trailing one of the passageways 90. The exemplary reticulated region 100 extends between an inboard end near the platform 26 and an outboard end near the tip 28 and has leading and trailing extremities/boundaries 102 and 104 and pressure and suction side extremities/boundaries 106 and 108 (FIG. 5).

The regions 80 and 100 may be formed in a similar manner to the region 42 of FIG. 1. For example, correspondingly-shaped ceramic foam precursors may initially be manufactured. These may be joined to non-reticulated ceramic cores for forming the feed passageways and/or to additional exterior ceramic components. These exterior ceramic components may serve to position the reticulated cores and feed cores during wax overmolding for forming the pattern and may become embedded in the applied ceramic shell.

Figure 6:
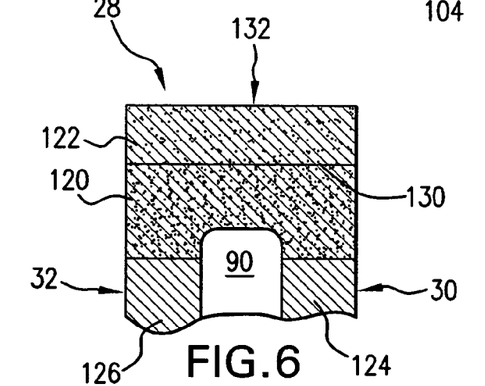
FIG. 6 is a transverse sectional view of an alternate tip region.

FIG. 6 shows an alternate tip reticulated region having subregions 120 and 122 of different porosity/permeability. In the exemplary embodiment, the reticulated region forms a tip portion of the airfoil in communication with the passageways 90. The proximal subregion 120 spans pressure and suction sidewall portions 124 and 126 and shares an outboard boundary 130 where an inboard boundary of the distal/outboard subregion 132. The exemplary reticulated region includes surface/boundary portions continuous with remainders of the pressure and suction side surfaces 30 and 32. In the exemplary embodiment, the inboard/proximal subregion 120 has a higher porosity (e.g., larger and/or more numerous voids) than the outboard/distal subregion 122. Thus, air may pass more freely from the passageway through the inboard/proximal subregion 120 than subsequently through the outboard/distal subregion 122. A principal portion of the air may exit the pressure and suction side boundary portions of the inboard/proximal subregion 122 with a lesser portion passing through the boundary 130 and exiting from the pressure and suction side boundaries of the second subportion 122 and its outboard extremity/boundary 132. The lower porosity of the second subportion 122 may also provide it with a greater strength and abrasion-resistance than the first subportion 120. The porosity of the second subportion 122 may thus be optimized to provide a desired degree of destructive deformation upon contact with a rub strip (so as to avoid other damage to the engine) while providing an appropriate degree of strength to allow for continued operation (including the possibility of further rub strip contact further attritting the second subportion 122). Such an embodiment may be created by securing two reticulated cores to the non-reticulated cores and the additional exterior components. The core forming the first subportion 120 would have a smaller porosity than the reticulated core forming the second subportion 122.

Figure 7:
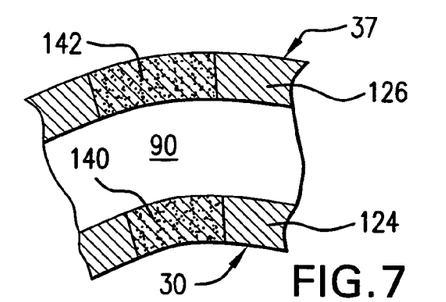
FIG. 7 is a partial streamwise sectional view of an intermediate portion of the airfoil of a blade of FIG. 1.

FIG. 7 shows yet alternate reticulated regions 140 and 142 within the pressure and suction side sidewalls 124 and 126. Each of these reticulated regions have outboard boundaries contiguous with remaining portions of the associated pressure or suction side surface 30 and 32 and inboard boundaries along the associated passageway(s) 90. In an exemplary embodiment, these reticulated regions may be spanwise elongate along the blade. FIG. 1 shows each region 140 extending along a major portion of the blade length. Shorter regions (e.g., extending over at least 20% or 30% of the span) are also possible.

Figure 8:
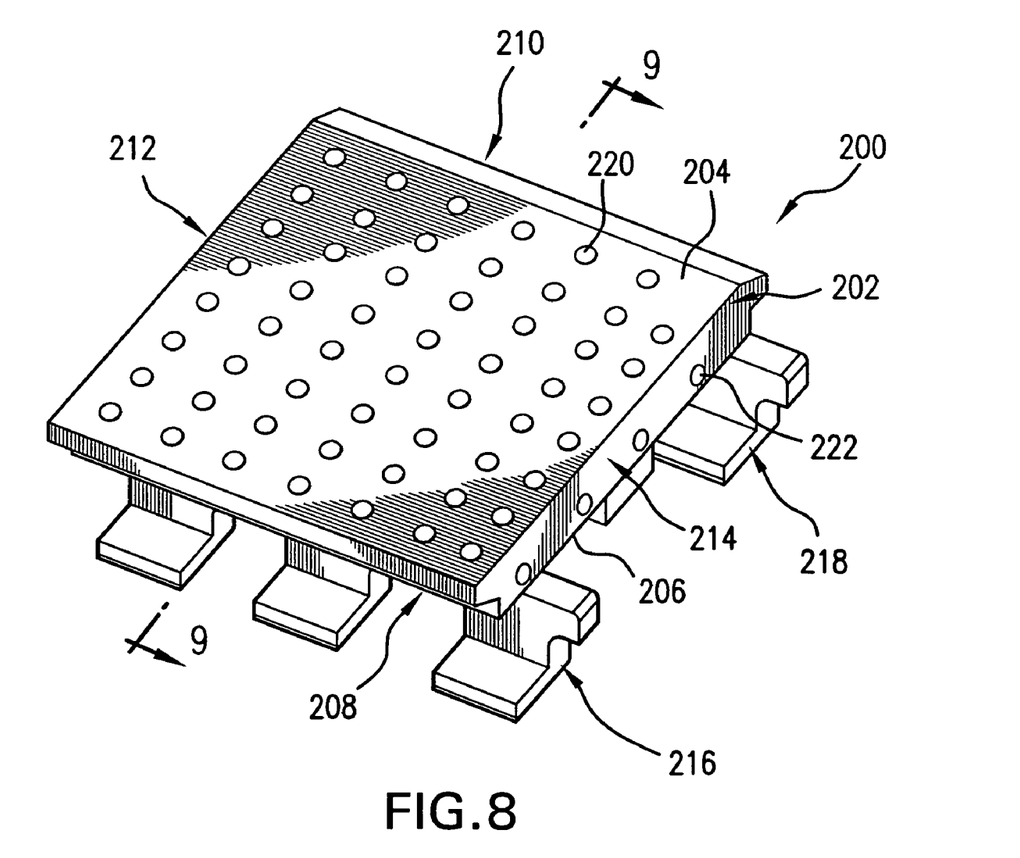
FIG. 8 is a view of a blade outer air seal.
Figure 9:
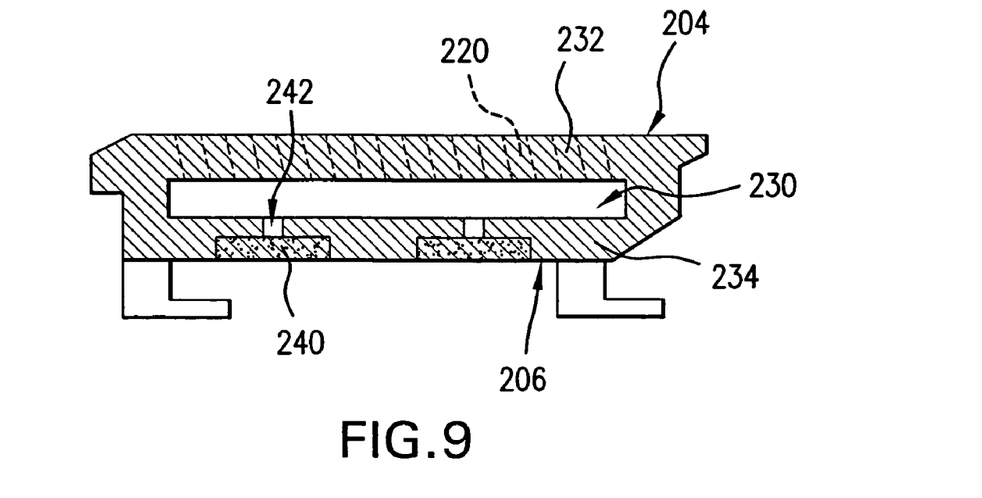
FIG. 9 is a sectional view of the blade outer air seal of FIG. 8, taken along line 9—9.

FIG. 8 shows a blade outer air seal (BOAS) 200 having a main body 202 with an inboard surface 204, an outboard surface 206, circumferentially-extending fore and aft ends/extremities 208 and 210, and longitudinally-extending ends/extremities 212 and 214. Groups of L-sectioned mounting brackets 216 and 218 are unitarily formed with the body and extend from the outboard surface 206 near the fore and aft ends. In the exemplary embodiment, an array of cooling holes 220 penetrates the inboard surface 204 and an array of holes 222 penetrate each of the circumferential end surfaces 212 and 214. The exemplary holes 220 have centerlines oriented off-normal to the surface 204 to provide desired film cooling flows. The holes 220 and 222 communicate with a central plenum 230 (FIG. 9). The plenum 230 separates inboard and outboard body wall portions 232 and 234. For additional cooling, the outboard portion is provided with reticulated regions 240 having outboard boundaries continuous with remaining portions of the outboard surface 206. The exemplary reticulated regions 240 may be of rectangular, circular, square, or other cross-section. In the exemplary embodiment, the reticulated regions 240 are open to the plenum 230 by means of one or more passageways or channels 242. The reticulated regions 240 and passageways 242 may provide a cooling air inlet flow to the plenum for feeding outlet flows through the holes 220 and 222. Variations and exemplary methods of manufacture may be similar to those described above for blade reticulated regions. By way of example, a non-reticulated ceramic core may form the plenum 230. Unitarily formed therewith or secured thereto (e.g., via ceramic adhesive) may be posts for forming the passageways 242 which, in turn, are connected to reticulated ceramic cores for forming the regions 240. Similar portions of the non-reticulated core or non-reticulated cores secured thereto may form the passageways 222 and/or 220 or these may be drilled post-casting. Optionally, the passageways 242 and/or holes 220 and/or 222 may be reticulated and formed by reticulated cores or core portions.

Figure 10:
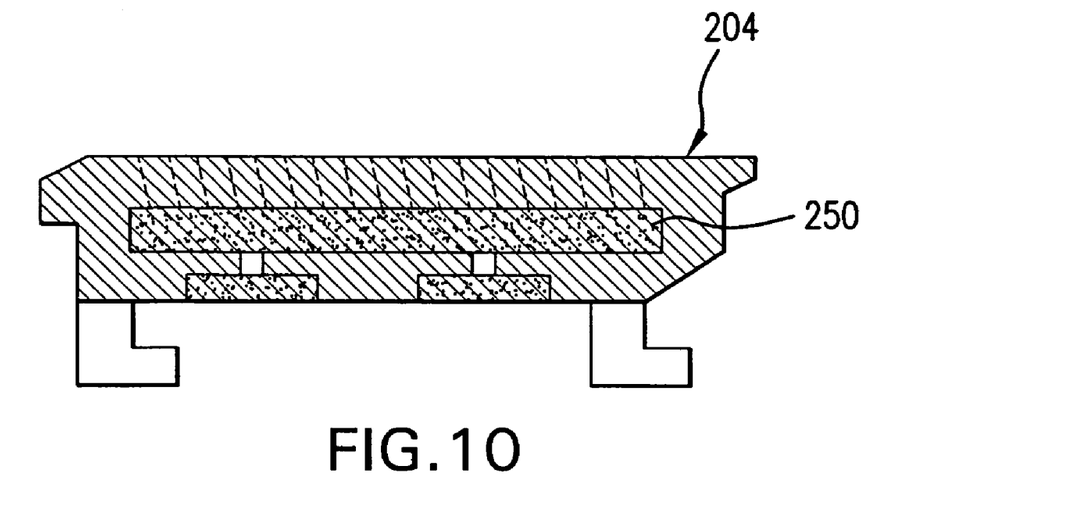
FIG. 10 a sectional view of an alternate blade outer air seal.

FIG. 10 shows an alternate implementation of the blade outer air seal 200 in which the plenum is replaced by a correspondingly shaped/sized reticulated region 250. This may be combined with additional blind or open reticulated regions and/or drilled or cast inlet holes to the outboard surface.

Figure 11:
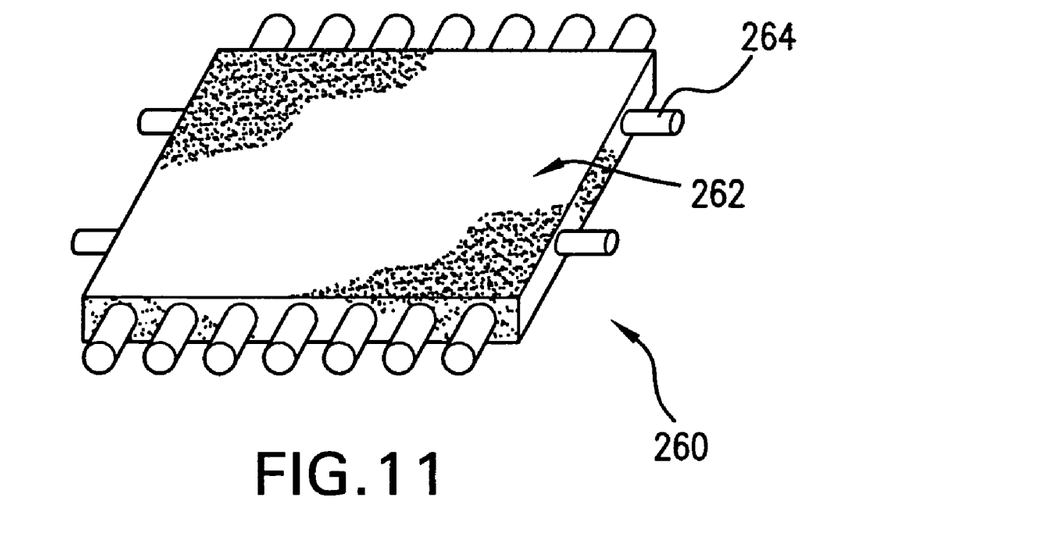
FIG. 11 is a view of a core for forming the blade outer air seal of FIG. 10.

FIG. 11 shows a reticulated ceramic core 260 having a body 262 for forming the reticulated region 250. Unitarily formed or integrally secured reticulated or non-reticulated ceramic posts 264 may protrude from circumferential and/or longitudinal ends of the body 262 for forming passageways such as 222. Additional reticulated and/or non-reticulated cores and/or core combinations may be secured to the faces of the body 262 (e.g., to the outboard face for forming inlet passageways). In manufacturing, the core 260 may be assembled to pre-molded wax pattern elements for forming inboard and outboard portions of the BOAS. For example, these two portions could meet along a common centerplane of the pins/posts 264. Ends of one or more of the posts 264 may protrude from the assembled wax for capturing within an applied shell so as to retain the core 260 in position within the shell upon removal of the wax and during subsequent introduction of molten metal. Alternatively, the wax or a portion thereof may be directly molded to/over the core 260.

Figure 12:
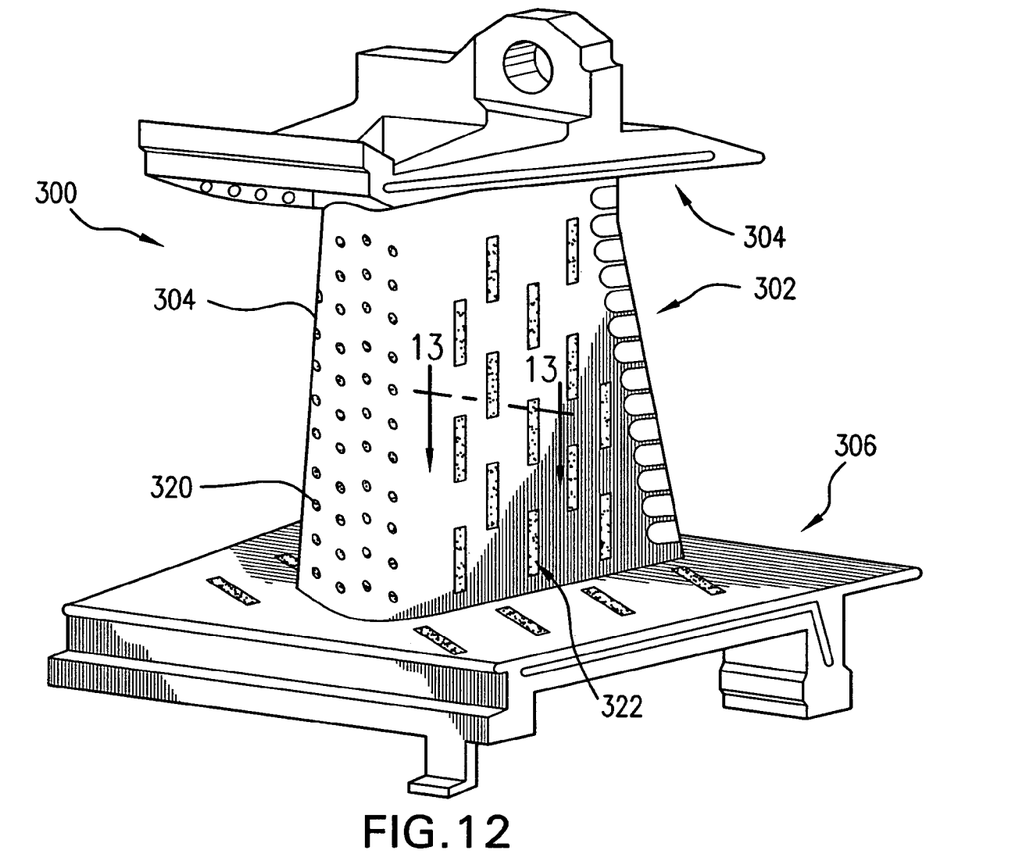
FIG. 12 is a view of a gas turbine engine vane.
Figure 13:
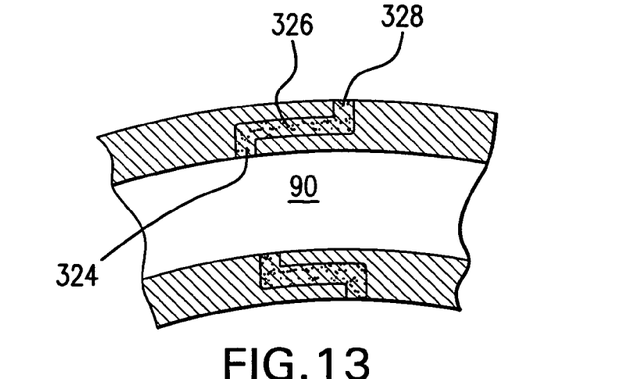
FIG. 13 is a partial streamwise sectional view of the airfoil of the vane of FIG. 12, taken along line 13—13.

FIG. 12 shows a vane 300 having an airfoil 302 extending between an inboard shroud 304 and an outboard shroud 306. The airfoil may have cooling features similar to those of the blade airfoil above. The inboard and/or outboard shrouds may have reticulated regions similar to those of the blade platform and/or the BOAS. The exemplary reticulated regions include a streamwise and spanwise array of leading edge reticulated regions 320 and streamwise and spanwise arrays of elongate pressure and suction side regions 322. The exemplary regions 320 are of relatively non-elongate section (e.g., circular). They may be essentially straight. The exemplary regions 322 are shown as spanwise elongate at the associated airfoil surface. However, they may have a convoluted streamwise section. For example, FIG. 13 shows a streamwise section including a first portion 324 extending from the inboard surface of the associated airfoil wall at the cavity 90 and generally normal to such surface. A second portion 326 extends within the wall generally parallel thereto. A third portion 328 extends to the associated pressure or suction side surface. The enhanced length of the portion 326 within the wall provides enhanced heat transfer.

Figure 14:
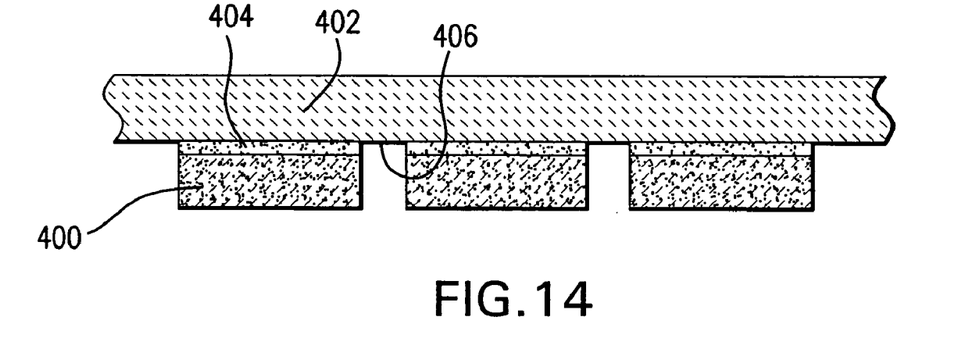
FIG. 14 is a sectional view of a first core attachment.

Various attachment means may be utilized to secure reticulated cores to non-reticulated cores. FIG. 14 shows reticulated ceramic cores 400 secured to a non-reticulated ceramic core 402 by means of a ceramic adhesive 404 atop an otherwise smooth and continuous surface 406 of the ceramic core 402.

Figure 15:
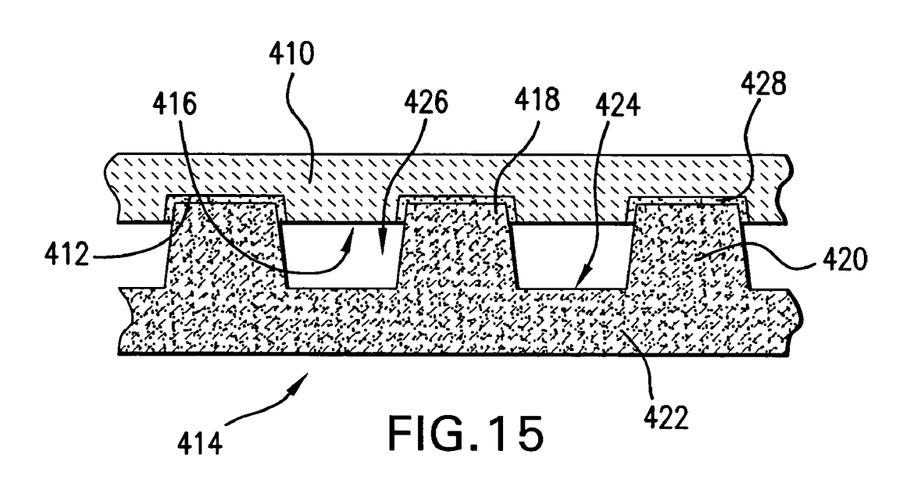
FIG. 15 is a sectional view of a second core attachment.

FIG. 15 shows an alternate embodiment wherein the non-reticulated ceramic core 410 has features 412 for registering and retaining the reticulated core 414 in a desired position/orientation. The exemplary features 412 comprise recesses in the adjacent surface 416 of the core 410 receiving complementary features 418 of the reticulated core 414. In the exemplary embodiment, the features 418 comprise end portions of posts 420 projecting from a main body 422 of the core 414 and spacing an adjacent surface 424 of the body away from the surface 416 to create a gap 426. Ceramic adhesive 428 may secure the features 412 and 418 to each other.

Figure 16:
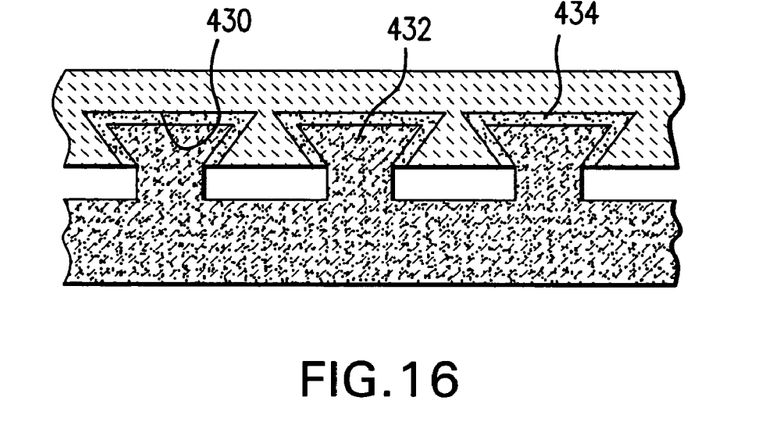
FIG. 16 is a sectional view of a third core attachment.

FIG. 16 shows yet a further variation in which the non-reticulated core registration and retention features comprise dovetail slots 430 and the complementary portions of the reticulated core comprise dovetail projection 432. The projections may be slid into the slots to assemble the cores. With such a mechanical back-locking effect, ceramic adhesive 434 is particularly optional. Although illustrated with respect to a reticulated core having a main body and multiple projections spacing the main body apart from the non-reticulated core, other implementations lacking the main body and/or lacking the associated gaps may be possible.

Figure 17:
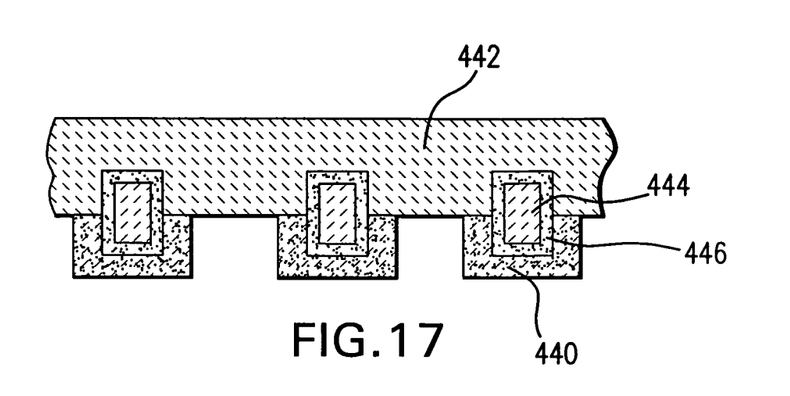
FIG. 17 is a sectional view of a fourth core attachment.

FIG. 17 shows the attachment of reticulated cores 440 to a non-reticulated core 442 via separately-formed pins 444 and ceramic adhesive 446. The pins may be straight or may have back-locking features either for directly engaging complementary features of one or both cores or for more robustly engaging the adhesive.

Figure 18:
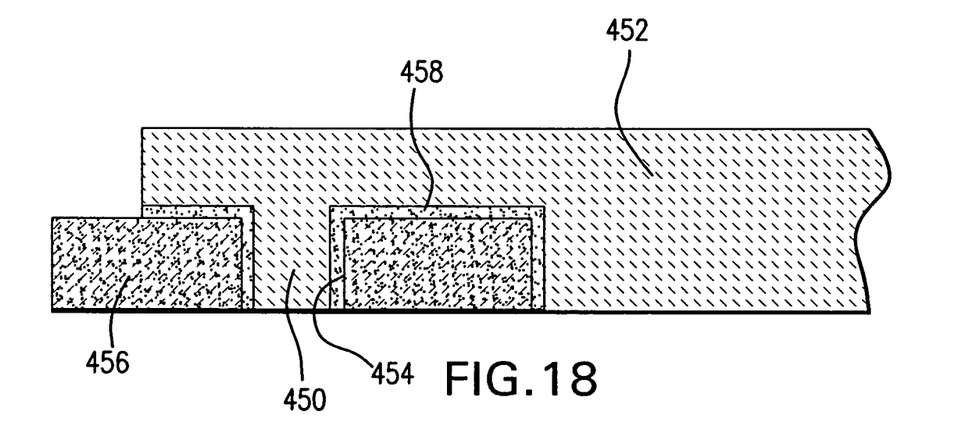
FIG. 18 is a sectional view of a fifth core attachment.

In yet alternate embodiments, attachment posts may be unitarily-formed with either the non-reticulated core or the reticulated core. For example, FIG. 18 shows an attachment post 450 protruding from a remaining portion of a unitary non-reticulated core 452 and being received by a corresponding aperture 454 in a reticulated core 456. A layer of ceramic adhesive 458 may further join the two cores.

Figure 19:
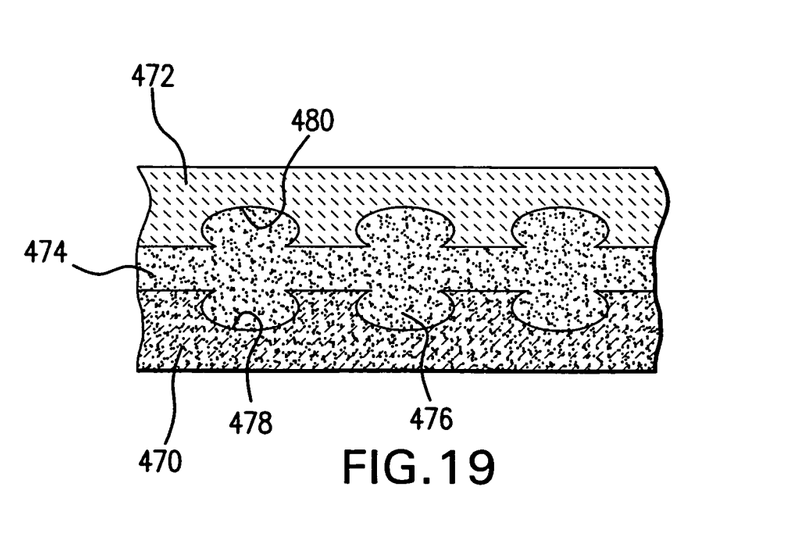
FIG. 19 is a sectional view of a sixth core attachment.

FIG. 19 shows pre-formed reticulated and non-reticulated cores 470 and 472 joined by a cast-in-place ceramic 474. The cast-in-place ceramic 474 may form back-locking projections 476 filling complementary back-locking recesses 478 and 480 in the cores. Alternatively, back-locking projections may be formed in one or both of the cores 470 and 472 with the castable ceramic forming the associated recess (es). By way of example, the cores 470 and 472 may be placed in a die and the castable ceramic (e.g., alumina- or silica-based self-hydrolizing material) injected into a space between the cores and permitted to dry or cure to solidify.

The reticulated elements may be formed by a variety of techniques. For example, an organic or inorganic reticulated material (e.g., a natural sponge, synthetic (e.g., polymeric) sponge or synthetic foam) may be coated with a ceramic slurry. In one exemplary situation, the slurry may finely coat the reticulated element so that even as coated the coated element is itself reticulate. The element may be firmly decomposed or melted (e.g., as a precursor to or part of firing the slurry to harden it) leaving the ceramic core with reticulations formed both by the voids from lost organic or inorganic material and from the voids in the as-coated element. Alternatively, the slurry may fully coat the element leaving no reticulation or voids. After thermal decomposition or melting, the reticulations may entirely be those due to the lost material. For multi-porosity cores, a piece of organic or inorganic material having zones of different porosity may be used in the slurry coating processes described above. Alternatively, separate pieces of such material (each having an associated porosity) may be assembled prior to the slurry coating process. Alternatively, separately-formed reticulate ceramic elements may be secured to each other.

Alternatively to a reticulate ceramic material, a reticulate metallic material may be used (for example, a refractory metal-based (e.g., molybdenum) foam or a non-refractory metal (e.g., nickel)). Such foam may be formed by similar processes. Such cores may be secured to each other by processes including welding, brazing, diffusion bonding, and/or other fusing. They also may be secured by similar means as ceramic cores (particularly when secured to ceramic cores). Alternatively, the metallic foam may be an intermediate, for example, the metallic foam may be filled with ceramic slurry which is allowed to harden. The metallic foam may be decomposed (e.g., thermally decomposed via oxidation at elevated temperature as such or otherwise chemically etched) to leave reticulated ceramic.

Other reticulate elements including carbon and composite (e.g., intermetallics) foams may be used either directly as cores or as core precursors.

One or more embodiments of the present invention have been described. Nevertheless, it will be understood that various modifications may be made without departing from the spirit and scope of the invention. For example, details of the particular components to which the teachings are applied may influence details of any particular implementation. Accordingly, other embodiments are within the scope of the following claims.

What is claimed is:

1. A method for manufacturing an article comprising:
providing at least one reticulate core element in a mold shell having a shape at least partially corresponding to a shape of the article;
introducing a molten metallic material to the shell so as to at least partially infiltrate into said reticulate core element;
permitting the molten metallic material to solidify;
destructively removing said shell and said reticulate core element, the removal of the reticulate core element leaving the article with one or more gas-permeable porous regions; and
chemically expanding said porous regions left in said solidified metallic material after said destructively removing.

2. The method of claim 1 further comprising:
integrating said solidified metallic material with a metallic substrate.

3. The method of claim 2 used to make a turbine engine blade outer air seal wherein the solidified material forms an exterior surface portion of the seal.

4. The method of claim 1 used to make a turbine engine airfoil element wherein the solidified material forms an exterior surface portion of the airfoil or of a platform of the element.

5. The method of claim 1 further comprising:
forming said reticulate core element by one or more of:
coating a reticulate organic material with a slurry and then firing;
coating a reticulate organic material with a metallic layer; and
coating a reticulate metallic material with a slurry and then destructively removing the reticulate metallic material.

6. The method of claim 1 wherein:
said reticulate core element has a first region of essentially a first characteristic pore size and a second region of essentially a second characteristic pore size, smaller than said first characteristic pore size.

7. The method of claim 1 wherein:
said reticulate core element is integrated with a non-reticulate core element.

8. The method of claim 7 wherein:
said non-reticulate core element forms one or more feed passageways;
said porous regions are outlet passageways in communication with the one or more feed passageways.

9. The method of claim 1 used to manufacture a gas turbine engine component.

10. A sacrificial investment casting core comprising:
a reticulate first portion; and
a non-reticulate second portion, wherein at least one of:
the first portion is secured to the second portion via a back-locking of the first portion relative to the second portion; and
the first portion is secured to the second portion via one or more pins having portions received in recesses in each of the first and second portions.

11. The core of claim 10 wherein:
the second portion is shaped for forming one or more feed passageways in a turbine engine element; and
the first portion is shaped for at least partially forming one or more outlet passageways from the one or more feed passageways.

12. The core of claim 10 wherein:
the second portion is shaped for forming one or more feed passageways in a turbine airfoil element; and
the first portion is shaped for at least partially forming a plurality of outlet passageways from the one or more feed passageways to at least one of pressure and suction sides of the airfoil.

13. The core of claim 10 wherein at least one of:
the first portion protrudes from the second portion;
the first portion is secured to the second portion via a ceramic layer;
the first portion is held spaced apart from the second portion with a gap therebetween.

14. A method for manufacturing the core of claim 10 comprising at least one of:
securing the second portion to the first portion via a ceramic adhesive;
fusing, bonding, or welding the second portion to the first portion; and
joining the first and second portions via one or more pins received in associated recesses in the first and second portions.

15. An article of manufacture comprising:
a cast metallic substrate; and
a cooling passageway system within the substrate and comprising:
one or more feed passageways for receiving cooling gas; and
one or more outlet passageways for discharging the cooling gas from the one or more feed passageways and having a reticulate passageway portion including a porous inboard subregion having a higher porosity than a porous outboard subregion.

16. The article of claim 15 wherein:
the substrate forms a major, by weight, portion of the article.

17. The article of claim 15 wherein:
the metal of the substrate is a single continuous piece of an alloy.

18. The article of claim 15 wherein:
the metal of the substrate is a iron-, nickel- or cobalt-based superalloy.

19. The article of claim 15 being a turbine element having:
an airfoil extending between inboard and outboard ends and having pressure and suction side surfaces.

20. The article of claim 19 wherein:
said reticulate portion is located at a tip of the airfoil.

21. A method for manufacturing an article comprising:
providing at least one reticulate core element in a mold shell having a shape at least partially corresponding to a shape of the article, the providing comprising coating a reticulate metallic material with a slurry and then destructively removing the reticulate metallic material;
introducing a molten metallic material to the shell so as to at least partially infiltrate into said reticulate core element;
permitting the molten metallic material to solidify; and
destructively removing said shell and said reticulate core element, the removal of the reticulate core element leaving the article with one or more gas-permeable porous regions.

22. A method for manufacturing an article comprising:
providing at least one reticulate core element in a mold shell having a shape at least partially corresponding to a shape of the article, the providing comprising coating a reticulate organic material with a metallic layer;
introducing a molten metallic material to the shell so as to at least partially infiltrate into said reticulate core element;
permitting the molten metallic material to solidify; and
destructively removing said shell and said reticulate core element, the removal of the reticulate core element leaving the article with one or more gas-permeable porous regions.

23. A method for manufacturing an article comprising:
providing at least one a refractory metal-based reticulate core element in a mold shell having a shape at least partially corresponding to a shape of the article;
introducing a molten metallic material to the shell so as to at least partially infiltrate into said reticulate core element;
permitting the molten metallic material to solidify; and
destructively removing said shell and said reticulate core element, the removal of the reticulate core element leaving the article with one or more gas-permeable porous regions.

24. The core of claim 10 wherein:
the first portion is secured to the second portion via said back-locking of the first portion relative to the second portion.

25. The core of claim 10 wherein:
the first portion is secured to the second portion via said one or more pins having portions received in said recesses in each of the first and second portions.

* * * * *